Patented Dec. 26, 1922.

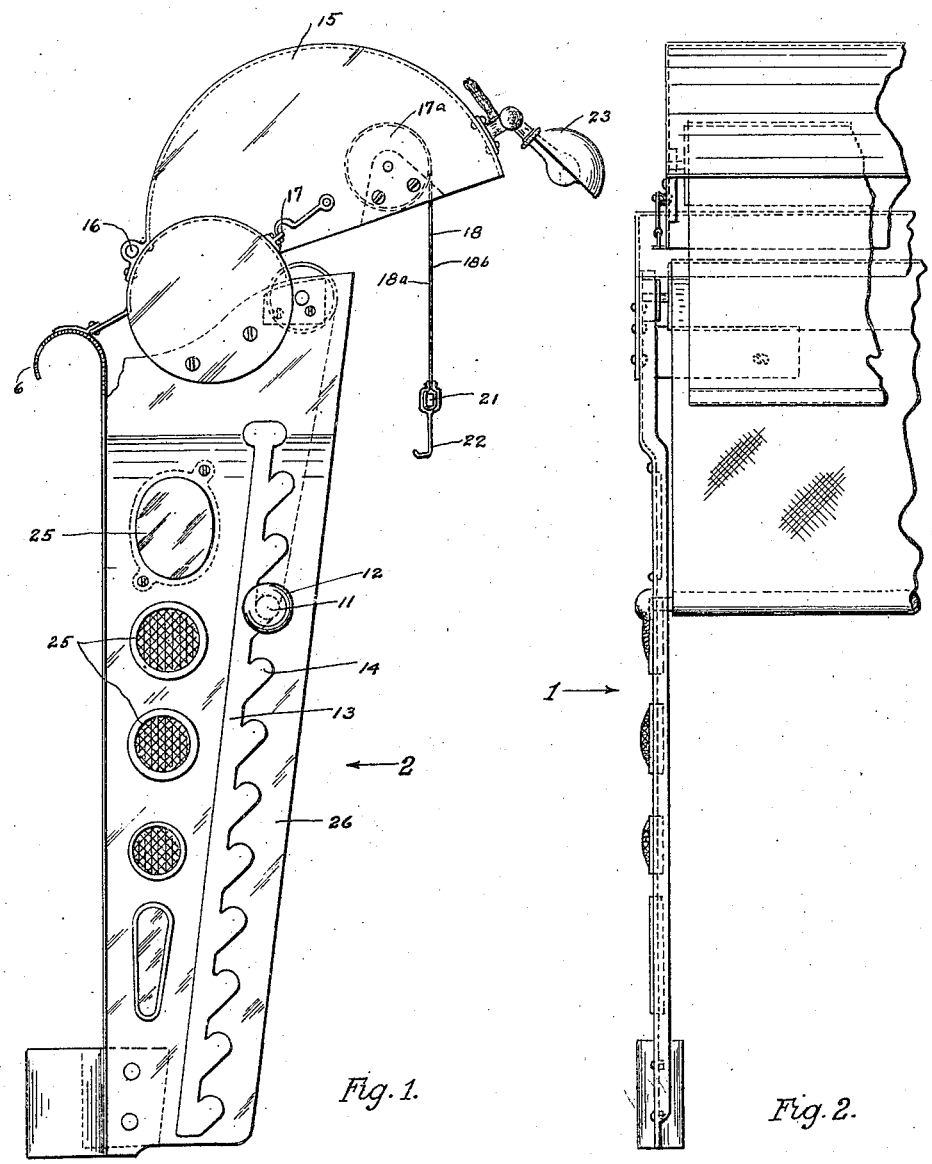

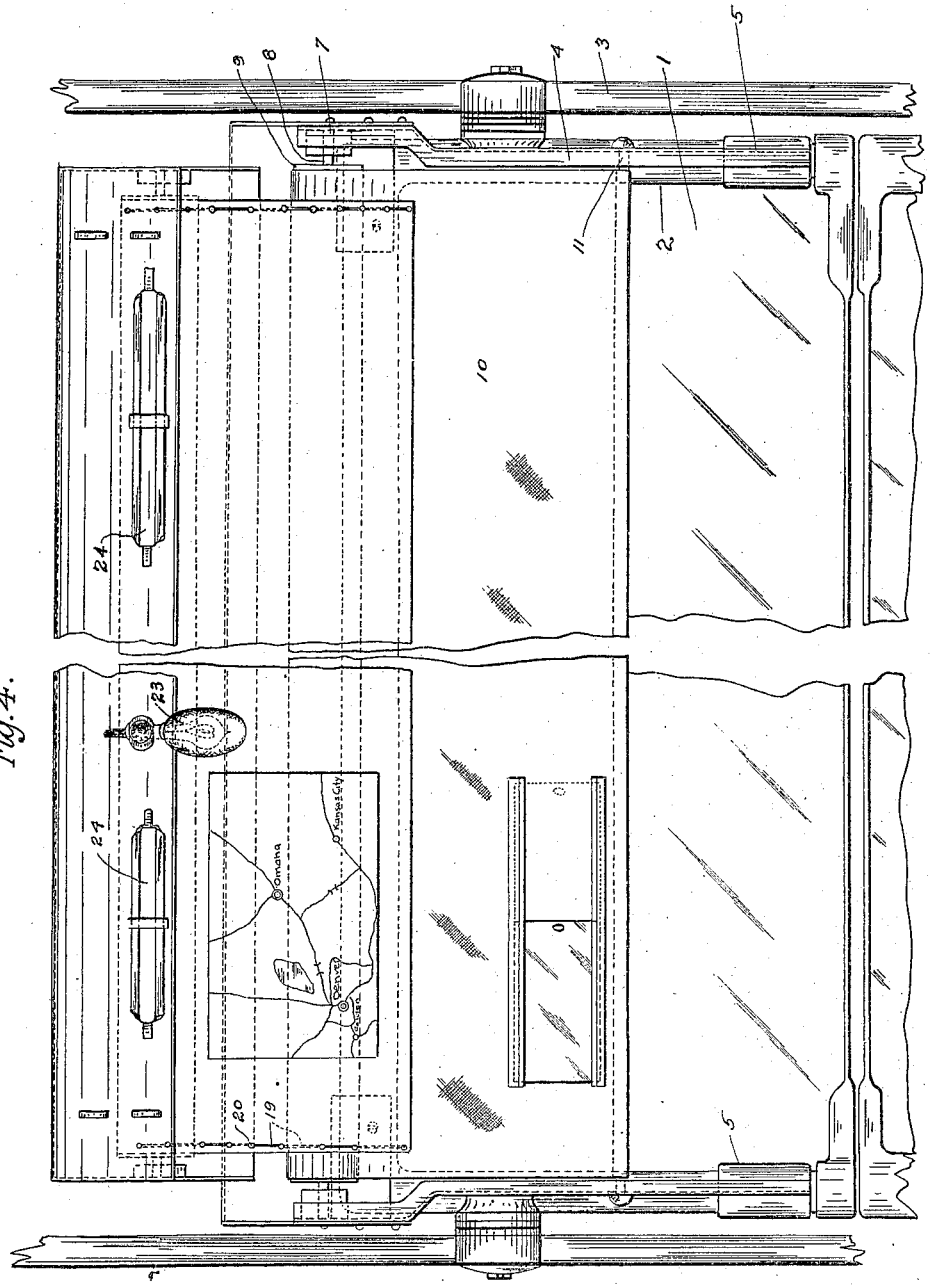

1,439,971

UNITED STATES PATENT OFFICE.

LOUIS K. MULFORD, OF DENVER, COLORADO.

WINDSHIELD SHADE AND UTILITY MAP HOLDER.

Application filed June 2, 1919. Serial No. 301,302.

*To all whom it may concern:*

Be it known that I, LOUIS K. MULFORD, a citizen of the United States, residing at 413 Kittridge Building, in the city and county of Denver, State of Colorado, have invented certain new and useful Improvements in Windshield Shade and Utility Map Holders, of which the following is a specification.

My invention relates to combination wind shield shade utility map holders. The primary object of my invention is the provision of a wind shield shade which will prevent the glare from the sunlight in the day time and head lights at night from affecting the sight of the automobile driver.

Another object of my invention is to provide a secondary roller shade so constructed that it may be used for carrying road maps or other printed or written matter in such a way as to enable the automobile driver to pull down the map or other written or printed matter before him while driving, for the purpose of reference.

Still another object of my invention is to provide the necessary frame work which supports this plurality of roller shades with various utility devices such as a card holder, thermometer, identification card holder, mirror, or any other contrivance which automobile drivers may wish to use.

Still another object of my invention is to provide a roller shade of opaque material with apertures of transparent colored material for the purpose of allowing the driver to see through it and at the same time preventing strong rays of light from dazzling the automobile driver's eyes.

With the above and other objects in view the present invention resides in the novel features of construction, formations, combinations and arrangement of parts to be hereinafter more particularly described, claimed and illustrated in the accompanying drawings forming a part of the present application in which:

Figure 1 is a side elevation showing the bracket and supporting part of a rolling shade with the map containing shade partly drawn down.

Figure 2 is a part front elevation of Figure 1.

Figure 3 is a partial plan view looking from the bottom up.

Figure 4 is a front elevation partly broken and shows the opaque shade partly drawn down and the map roller shade extended downward part way showing the arrangement of a light and several card containers on the upper part of the supporting frame.

Throughout the following detailed description and on the several figures of drawings similar parts are referred to by like reference characters.

Numeral 1 is a wind shield.
Numeral 2 is the wind shield frame.
Numeral 3 is the wind shield supporting frame.

Bracket 4 is held to the wind shield frame by a clamp 5 at the lower end and a curved plate or hook 6 at the upper side of the frame. This bracket at its upper end contains proper bearings 7 in which the shaft 8 of the shade roller 9 is mounted. This shade roller is of the plain spring type and has no pawl or ratchet to keep it from winding up. The shade 10 is fastened to this roller and in order to draw the shade down and hold it in position the lower end of the shade is affixed to a rod 11 which has an expanded end button head 12. The button head is made large enough so that it can not readily pass through the slot 13 of the bracket 4. When pulling the shade down rod 11 passes up or down through groove 13 and at the desired height a movement of the rod will cause it to engage in the notches 14. The tension on the roller shade spring will keep it engaged in these notches and therefore prevent it from raising up unless the operator so desires. At the top of bracket 4 is fastened a casing 15 which is in part hingedly mounted by means of a hinge 16 and held in place by a hook and eye 17. The reason for hinging this is to make it accessible for adjusting the roller shade. The casing 15 revolvably supports a secondary roller 17ª upon which the map containing shade 18 is mounted.

The shade itself consists of two plies of material, one of which 18ᴮ is transparent. The other can either be transparent, translucent or opaque as desired by the user. The two plies of this shade are held together by a lacing 19 which passes in and out through the corresponding apertures of both 18ᴬ and 18ᴮ. The aperture 20 being of sufficient size to allow a movement due to the difference of circumference distance when the shade is wound upon the roller 17ᴬ. At the bottom of this shade is also fastened a rod 21 which makes an easy grip or handle by which the shade may be pulled up or down. At a convenient place along this rod there is clamped a hook 22 which is used when the map container shade is pulled down to such an extent where it can be hooked on to the cross rod 11 of shade 10 or to the handle which is usually found on the lower wind shield. It can be readily seen that by opening the lacing on either one side or the other a map may be inserted between the component parts of the shade and be readily visible and readable by the operator. Also memorandums of certain stops to be made during the tour can be placed between these two component parts and when not in use the shade can be raised out of sight in order that there will be no obstruction to the view of the driver. The same can be done with shade 10. In a number of instances if the map containing shade is made of material which allows a vision but prevents glare the lower shade may be raised completely and upper shade 18 may be drawn down and if the maps are placed to one side the operator may have a full view ahead without having the glare from an oncoming head light or from the rays or sunlight affect his vision. The casing 15 is also provided with a shaded electric light 23 for facilitating the reference to the maps or memorandums at night. This same casing is also provided with card containers 24 which are conveniently made of strap-iron or elastic bands. This is of great advantage to the salesman or business man having to make numerous stops as it is easily accessible for him to take the printed matter from these racks while alighting. Bracket 4 is provided with a number of apertures 25 which may contain a double set of glass for the purpose of having the identification card set between them or a vanity case and mirrors as well as a number of colored or fancy glasses by which combination of colors certain clubs or organizations may be known, similar to the use of colored lights when designating various boat clubs along the shores.

It should be understood in this connection that various minor changes in the specific details of construction can be resorted to within the scope of the appended claims without departing from the spirit or sacrificing any of the advantages of the invention.

It should be further understood that while I have shown two distinct shade rollers or a shade roller and map roller, either one may be dispensed with or another one or more may be added.

Having thus fully described my invention what I claim is new and desire to protect by Letters Patent is:

1. A translucent glare-eliminating curtain, means to mount the same on a wind shield, the curtain being two-ply to support maps and the like therebetwen on one portion of the curtain and to permit vision through other portions of the curtain at the same time.

2. A curtain having two plies for the reception of maps and the like therebetween, both of said plies being transparent.

3. A curtain having means for mounting the same upon an automobile, said curtain being two-ply for the reception of maps and the like between the plies, one ply being transparent for viewing the maps and the like therethrough and the other ply being translucent.

4. A glare-eliminating curtain, means to mount the same on a windshield, said curtain having two plies for the reception of maps and the like therebetween, the lower ends of said two plies being connected, means at one edge for holding the plies together when in use and to permit opening the same for placing maps and the like between the plies, and means connecting the plies at the opposite edge.

5. A curtain having two plies for the reception of maps and the like therebetween, the two plies being connected together at the lower ends thereof, one ply being transparent for viewing the maps and the like therethrough, and means connecting the edges of the two plies and adapted to permit opening the plies for placing maps and the like therebetween.

6. A curtain having two plies for the reception of maps and the like therebetween, one ply being transparent for viewing the maps and the like, and means connecting the plies at lower and opposite side edges adapted to permit opening the plies at one edge for placing maps and the like between the plies.

7. A curtain having two plies for the reception of maps and the like therebetween, one ply being adapted for viewing the maps and the like therethrough, and means connecting the plies at lower and opposite side edges, said means at one edge being in the form of a lacing adapted to permit opening the plies.

8. A curtain adapted to be rolled and having two plies for the reception of maps and the like therebetween, apertures provided in the sides of said curtain, the lower end of one ply being connected to the other ply, and means mounted in said plies at said sides and passing through said apertures, said apertures being sufficiently large to compensate for the differences in circumferential length when the curtain is rolled.

9. A curtain having two plies for the reception of maps and the like therebetween, one ply being adapted for viewing maps and the like therethrough, said plies being connected at lower and opposite side edges.

In testimony whereof I have affixed my signature in the presence of two witnesses.

LOUIS K. MULFORD.

Witnesses:
MAYE GREEN,
CHARLES W. SMITH.